UNITED STATES PATENT OFFICE.

FRANK EDWARD ELMORE, OF BOXMOOR, ENGLAND.

PROCESS FOR THE EXTRACTION OF LEAD AND ZINC FROM THEIR ORES.

1,346,642.

Specification of Letters Patent.

Patented July 13, 1920.

No Drawing.

Application filed April 1, 1919. Serial No. 286,783.

*To all whom it may concern:*

Be it known that I, FRANK EDWARD ELMORE, a subject of the King of Great Britain, residing in Boxmoor, England, have invented certain new and useful Improvements in Processes for the Extraction of Lead and Zinc from Their Ores, of which the following is a specification.

This invention relates to an improved process for separating, in forms suitable for metallurgical treatment, lead and zinc from lead-zinc sulfid ores, concentrates or the like in which these metals co-exist in the form of sulfids.

It has been proposed to effect this separation by means of the differential action of sulfuric or hydrochloric acid alone, or of such acid in presence of a suitable salt, such as a soluble chlorid, whereby the lead sulfid is converted into a soluble compound while the zinc sulfid remains substantially unattacked. In the proposed processes the soluble lead compound, after separation from the unattacked zinc sulfid by means of a hot solvent, has been recovered by crystallization while the zinc sulfid has been further treated for the recovery of the zinc therein.

The present invention relates to improvements in that form of the process in which hydrochloric acid alone, in the absence of a soluble chlorid or like salt, is the acid agent employed for attacking the ore, and has for its object to provide a process characterized by economy in the consumption of hydrochloric acid and other materials, coupled with a high percentage recovery and degree of purity of the soluble lead compound produced.

According to one part of the invention the ore (which term includes concentrates and the like) is first heated at about 100° C., with a sufficient quantity of strong hydrochloric acid until substantially the whole of the lead has been converted into chlorid in known manner, with evolution of sulfureted hydrogen, the zinc sulfid remaining substantially unattacked. The quantity of acid used should be as small as is compatible with efficient conversion of the sulfid into chlorid. The mixture is now cooled, and any excess of hydrochloric acid is removed, along with soluble impurities present, by washing the lead chlorid and mineral residue with a limited quantity of water. The lead chlorid thus freed from soluble impurities is then extracted from the mass by means of a hot solvent which consists of a solution of lead chlorid in water or in strong brine and which constitutes the mother liquor from previous operations. The hot solution, after separation from the undissolved matter (which contains the zinc in the form of sulfid), is cooled, whereupon a portion of the lead chlorid crystallizes out and can be collected for use, preferably as hereinafter described, while the mother liquor is re-heated and used for extracting lead chlorid from another batch of the ore. The extraction process thus becomes a cycle in which the same quantity of solvent serves continuously to convey the purified lead chlorid from the treated ore to the crystallizing vat.

The following example illustrates this part of the invention. A lead-zinc sulfid ore from Burmah containing 17.1 per cent. of lead and 42.0 per cent. of zinc is ground to pass through a 60-mesh standard sieve. Twenty kilos of the powder are mixed with 12 liters of strong hydrochloric acid (containing 330 grams of HCl per liter) in an earthenware steam-heated vessel and the mixture is heated at about 100° C. until the evolution of sulfureted hydrogen has practically ceased. The mixture is now cooled, the excess of hydrochloric acid is removed along with soluble impurities present by washing the lead chlorid and mineral residue with a limited quantity of cold water, and the lead chlorid is then extracted from the mass by means of hot mother liquor at about 100° C. If the mother liquor consists of an aqueous solution of lead chlorid, about 200 liters thereof may be employed for the extraction, if it consists of a solution of lead chlorid in strong brine, about 150 liters may be employed. The hot solution, after separation from the undissolved mineral residue, is cooled, whereupon a portion of the lead chlorid crystallizes out and is collected for use, while the mother liquor is again heated and used as hereinbefore described. The mineral residue thus freed from lead, is in suitable condition to be metallurgically treated for recovery of the zinc.

The proportions mentioned in the foregoing example are merely illustrative. The best proportions to use in any given case will depend to some extent upon the nature of the ore treated and other conditions.

Owing to the employment of hydrochloric acid instead of sulfuric acid as the acid agent for attacking the ore, and the removal of soluble impurities from the treated mass as above described, the use of brine, which in certain localities is not easily obtainable may be altogether dispensed with and the rejection of lead in the solvent liquor, necessitated by the accumulation of impurities therein, is reduced to a minimum. Further, the lead chlorid obtained is of a high degree of purity. If, however, the solvent liquor contain brine, its impoverishment by the formation of sodium sulfate and the accumulation of impurities is reduced to such a degree that the consumption of salt and occasional loss of lead on rejecting the contaminated liquor are reduced to negligible proportions. A further benefit resulting from the removal of any remaining acid from the treated mass, prior to the extraction with solvent liquor, is that the latter remains substantially free from acid and metallic pipes, pumps, vats or the like may be employed with but little risk of contamination of the liquor or corrosion of the plant.

According to another part of the invention the above described process is improved by returning to the vessel in which the ore is attacked the hydrochloric acid consumed in forming the lead chlorid. For this purpose the lead chlorid obtained is heated with sulfuric acid whereby hydrochloric acid gas is evolved; the gas is absorbed in water and the solution is used for treating a further batch of ore. The sulfuric acid required may be obtained by utilizing in known manner the sulfureted hydrogen evolved during the attack upon the ore by the acid. By operating in this manner the process to a substantial extent constitutes an economic cycle in which the hydrochloric acid and (if brine be used) the sodium chlorid are largely conserved. These considerations are of importance in the case of some ore deposits which are not favorably situated as regards supplies of hydrochloric acid and salt, since they render it practicable to treat the ore on the spot instead of transporting it to localities where such agents are readily obtainable. To effect a further saving in acid, it is in some instances advisable to subject the ore to a preliminary concentration so as to reduce the proportion of useless, acid-consuming material present.

The lead sulfate made from the chlorid may be mixed with lead sulfid and smelted in known manner, and the lead sulfid or part of it necessary for the purpose may be made by utilizing the sulfureted hydrogen evolved on treatment of the ore with hydrochloric acid.

Having thus described the nature of the said invention and the best means I know of carrying the same into practical effect, I claim:—

1. Process of separating lead compounds from zinc compounds in lead-zinc sulfid ores, concentrates and the like consisting in heating the pulverized ore with a sufficient quantity of strong hydrochloric acid until substantially the whole of the lead has been converted into lead chlorid while the zinc sulfid remains substantially unattacked, cooling the heated mixture, washing the mass with a limited quantity of cold water to remove excess of acid and soluble impurities, then separating the lead chlorid from the zinc sulfate by extraction of the former with a hot solution of lead chlorid in water or in strong brine, separating the solution from the undissolved matter and cooling it to crystallize lead chlorid, separating the mother liquid from the crystals and using it when re-heated to leach a further batch of lead chlorid from zinc sulfid, the process being repeated so that the same quantity of solvent serves repeatedly to convey purified lead chlorid to the crystallizing vessel, while leaving zinc sulfid in a condition suitable for metallurgical treatment.

2. Process for separating lead compounds from zinc compounds in lead-zinc sulfid ores, concentrates or the like consisting in heating the pulverized ore with a sufficient quantity of strong hydrochloric acid until substantially the whole of the lead has been converted into lead chlorid while the zinc sulfid remains substantially unattacked, cooling the heated mixture, washing the mass with a limited quantity of cold water to remove excess of acid and soluble impurities, then separating the lead chlorid from the zinc sulfid by extraction of the former with a hot solution of lead chlorid in water or in strong brine, separating the solution from the undissolved matter and cooling it to crystallize lead chlorid, separating the mother liquid from the crystals and using it when re-heated to leach a further batch of lead chlorid from zinc sulfid, the process being repeated so that the same quantity of solvent serves repeatedly to convey purified lead chlorid to the crystallizing vessel, while leaving zinc sulfid in a condition suitable for metallurgical treatment, heating the crystallized lead chlorid with sulfuric acid, dissolving the evolved hydrochloric acid in water and using the solution for treating a further batch of the ore.

In testimony whereof I have signed my name to this specification.

FRANK EDWARD ELMORE.